United States Patent
Son et al.

(10) Patent No.: US 10,303,286 B2
(45) Date of Patent: May 28, 2019

(54) HAPTIC DRIVING APPARATUS AND ELECTRONIC DEVICE HAVING HAPTIC FUNCTION

(71) Applicants: LG Display Co., Ltd., Seoul (KR); Gwangju Institute of Science and Technology, Gwangju (KR)

(72) Inventors: JiEun Son, Paju-si (KR); KiDuk Kim, Paju-si (KR); JongHee Hwang, Goyang-si (KR); Je Ha Ryu, Gwangju (KR); Hee Won Kim, Gwangju (KR); Jeong Goo Kang, Gwangju (KR)

(73) Assignees: LG Display Co., Ltd., Seoul (KR); Gwangju Institute of Science and Technology, Gwangju (KR)

( * ) Notice: Subject to any disclaimer, the term of this patent is extended or adjusted under 35 U.S.C. 154(b) by 13 days.

(21) Appl. No.: 15/139,283

(22) Filed: Apr. 26, 2016

(65) Prior Publication Data
US 2016/0320901 A1    Nov. 3, 2016

(30) Foreign Application Priority Data
Apr. 30, 2015 (KR) .................. 10-2015-0061224

(51) Int. Cl.
*G06F 3/041* (2006.01)
*G06F 3/01* (2006.01)
*G06F 3/044* (2006.01)

(52) U.S. Cl.
CPC ............ *G06F 3/0416* (2013.01); *G06F 3/016* (2013.01); *G06F 3/044* (2013.01)

(58) Field of Classification Search
CPC ................................... H03G 1/0035
See application file for complete search history.

(56) References Cited

U.S. PATENT DOCUMENTS

| | | | | |
|---|---|---|---|---|
| 4,568,840 A | * | 2/1986 | Kenji | H03G 1/0035 327/574 |
| 6,373,474 B1 | * | 4/2002 | Katabami | G06F 3/044 178/18.01 |
| 9,310,953 B1 | * | 4/2016 | Maharyta | G06F 3/044 |
| 2005/0054390 A1 | * | 3/2005 | Tuovinen | B06B 1/0215 455/575.1 |
| 2006/0197592 A1 | * | 9/2006 | Chang | H03F 1/34 330/86 |
| 2010/0171715 A1 | * | 7/2010 | Peterson | G06F 3/016 345/173 |
| 2011/0285667 A1 | * | 11/2011 | Poupyrev | G06F 3/016 345/174 |
| 2012/0188180 A1 | * | 7/2012 | Yang | G06F 3/016 345/173 |
| 2012/0327006 A1 | * | 12/2012 | Israr | G06F 3/044 345/173 |

(Continued)

*Primary Examiner* — Lunyi Lao
*Assistant Examiner* — Benjamin X Casarez
(74) *Attorney, Agent, or Firm* — Fenwick & West LLP

(57) ABSTRACT

A haptic driving apparatus provides a user with electrovibration of certain strength regardless of a variance of a surrounding environment, and an electronic device has a haptic function. The haptic driving apparatus comprises a haptic electrode driver generating a haptic driving signal to supply the generated haptic driving signal to a haptic electrode through a current monitor and varying the haptic driving signal in accordance with voltages at both ends of the current monitor.

19 Claims, 7 Drawing Sheets

(56) References Cited

U.S. PATENT DOCUMENTS

| | | | |
|---|---|---|---|
| 2013/0063381 A1* | 3/2013 | Wakuda | G06F 3/016 345/173 |
| 2013/0063394 A1* | 3/2013 | Wakuda | G06F 3/044 345/174 |
| 2013/0307789 A1* | 11/2013 | Karamath | G06F 3/016 345/173 |
| 2014/0139327 A1* | 5/2014 | Bau | G06F 3/016 340/407.1 |
| 2014/0320435 A1* | 10/2014 | Modarres | G06F 3/0412 345/173 |
| 2015/0054753 A1* | 2/2015 | Morgan | A61B 17/068 345/173 |
| 2015/0054773 A1* | 2/2015 | Jiang | G06F 3/016 345/174 |
| 2015/0205357 A1* | 7/2015 | Virtanen | G06F 3/016 340/407.2 |
| 2016/0357342 A1* | 12/2016 | Olley | G06F 3/044 |

\* cited by examiner

HAPTIC DRIVING APPARATUS AND ELECTRONIC DEVICE HAVING HAPTIC FUNCTION

CROSS REFERENCE TO RELATED APPLICATIONS

This application claims the benefit of the Korean Patent Application No. 10-2015-0061224 filed on Apr. 30, 2015, which is hereby incorporated by reference for all purposes as if fully set forth herein.

BACKGROUND OF THE INVENTION

1. Field of the Invention

The present invention relates to an apparatus and a method, which may provide a user with electrovibration.

2. Discussion of the Related Art

Recently, a haptic technology for providing electrovibration to a skin of a human body by using an electric field (or frictional force) has been developed together with a touch technology. In this case, the haptic technology means a haptic feedback technology, which uses percipience through a tactile organ of a human body, and allows a user to feel various surface touches during a touch. Electrovibration is based on an electrostatic force occurring in two electrode plates when an alternating current voltage is applied between the two electrode plates of a capacitor comprised of a dielectric.

FIG. 1 is a diagram briefly illustrating a haptic driving apparatus of the related art. Referring to FIG. 1, the haptic driving apparatus of the related art includes a haptic electrode 10, an insulating material 20 formed on the haptic electrode 10 to insulate a finger FG from the haptic electrode 10, and a haptic driver 30 supplying a haptic voltage Vs to the haptic electrode 10. The haptic driving apparatus of the related art provides a user with electrovibration based on an electrostatic force generated between the finger FG and the haptic electrode 10 by applying the haptic voltage Vs to the haptic electrode 10. At this time, since the finger FG is electrically insulated from the haptic electrode 10 by the insulating material 20, the user fails to feel electrovibration until the finger is moved, due to a very weak electrostatic force in a state that the finger is not moved.

FIG. 2 is an electric equivalent circuit diagram illustrating electrovibration generated between a finger and a haptic electrode. Referring to FIG. 2, the insulating material 20 formed on the haptic electrode 10 may be modeled by a capacitor Ci. Also, the finger FG is comprised of a layer of dead skin cells and a hypodermis beneath the layer of dead skin cells, and the layer of dead skin cells may be modeled by parallel connection of a resistor Rsc and a capacitor Csc. An inner body may be modeled by parallel connection of series connection (RC series) of a resistor Rex based on an extracellular path, a resistor based on an intracellular path and a capacitor. According to this modeling, the haptic driving apparatus of the related art may be expressed by finger impedance ZF, body impedance Zb and external impedance Ze, which are connected in series between a voltage source Vs and a ground. In this case, the finger impedance ZF may be defined as impedance comprised of a capacitor Ci, a resistor Rsc and a capacitor Csc, the body impedance Zb may be defined as impedance comprised of a resistor Rex and RC series of a resistance and a capacitor, and the external impedance Ze may be defined as impedance related to a surrounding environment.

The finger impedance ZF and the body impedance Zb have the same frequency trend but are connected with each other in series and the finger impedance ZF is greater than the body impedance Zb as much as about 100 times, whereby the body impedance Zb may be disregarded. On the contrary, the external impedance Ze is impedance existing between another side of the human body and a ground of a circuit, and has almost several ohms Ω if a user is connected with the ground of the circuit through a conducting wire but has a great variation to reach maximum several mega-ohms MΩ if not so.

Although the finger impedance ZF varies depending on users due to a dead skin cell layer thickness or contact area of a finger, which differs from individual to individual, this variance of the finger impedance ZF may be regarded as a fixed value as compared with a variance of the external impedance Ze. Therefore, if the voltage Vs is applied to the haptic electrode 10, a value of a valid voltage VF of the voltage Vs, which generates electrovibration, varies depending on a variance of the external impedance and not the finger impedance ZF, whereby strength of electrovibration felt by a user is varied by the external impedance Ze to the surrounding environment. In this case, the external impedance Ze has the smallest value if the user is directly grounded with the circuit, and may be varied depending on a variance of the surrounding environment, such as ambient humidity, ambient temperature, a material (wood floor, cement, or the like) of a floor where the user stands, types of shoes (leather shoes, rubber shoes, barefoot, etc.), and a distance between the user and a grounded object located near the user if the user is not directly grounded with the circuit.

Therefore, the haptic driving apparatus of the related art has a problem that the strength of electrovibration felt by each user is varied depending on the external impedance Ze, that is, a variance of the surrounding environment despite the same voltage being applied to the haptic electrode.

SUMMARY OF THE INVENTION

Accordingly, the present invention is directed to a haptic driving apparatus and an electronic device having a haptic function, which substantially obviate one or more problems due to limitations and disadvantages of the related art.

An advantage of the present invention is to provide a haptic driving apparatus that may provide a user with electrovibration of certain strength regardless of a variance of a surrounding environment and an electronic device having a haptic function.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a haptic driving apparatus comprises a haptic electrode driver generating a haptic driving signal to supply the generated haptic driving signal to a haptic electrode through a current monitor and varying the haptic driving signal in accordance with the current supplied to the haptic electrode.

In another aspect of the present invention, an electronic device having a haptic function comprises a touch panel driver including a touch panel arranged on a display panel, having a plurality of first electrodes and a plurality of second electrodes to sense a user touch and a haptic driver supplying a haptic driving signal to at least one of the first and second electrodes during a haptic driving mode, wherein the haptic driver includes a haptic electrode driver generating the haptic driving signal to supply the generated haptic driving signal to at least one of the first and second electrodes through a current monitor and at the same time varying the haptic driving signal in accordance with current supplied to at least one of the first and second electrodes as determined by the current monitor.

In still another aspect of the present invention, a haptic device comprising a haptic electrode driver is configured to generate a haptic driving signal for electrovibration and to supply the generated haptic driving signal to the haptic electrode, wherein the haptic electrode driver is configured to vary the haptic driving signal based on a current supplied to the haptic electrode, the current supplied based at least in part on the haptic driving signal. The haptic device further comprises a detector circuit connected between the haptic electrode driver and the haptic electrode, the detector circuit configured to sense the current supplied to the haptic electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, preferred embodiments of a haptic driving apparatus and an electronic device having a haptic function according to the present invention will be described in detail with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted.

Figure 1:
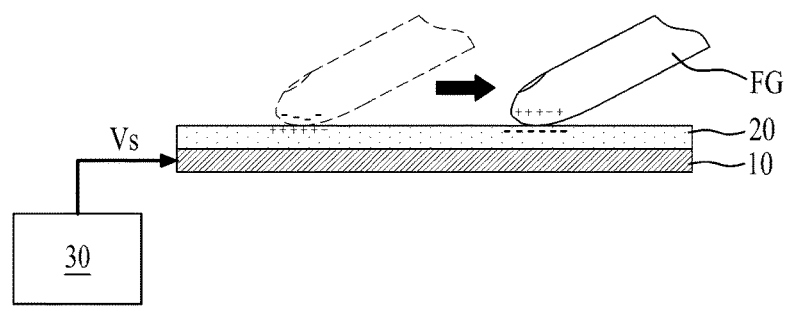
FIG. 1 is a diagram briefly illustrating a haptic driving apparatus of the related art.
Figure 2:
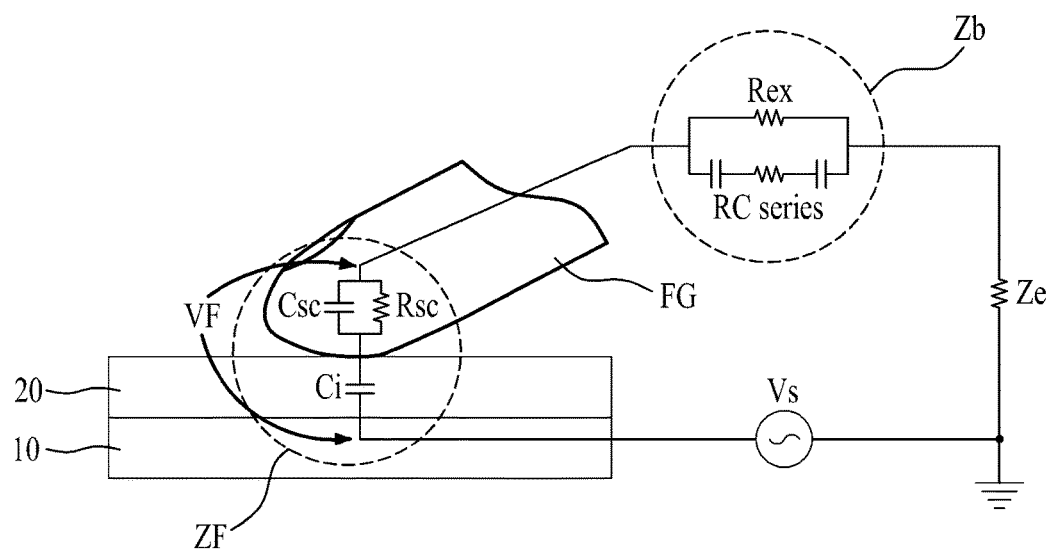
FIG. 2 is an electric equivalent circuit diagram illustrating electrovibration generated between a finger and a haptic electrode.
Figure 3:
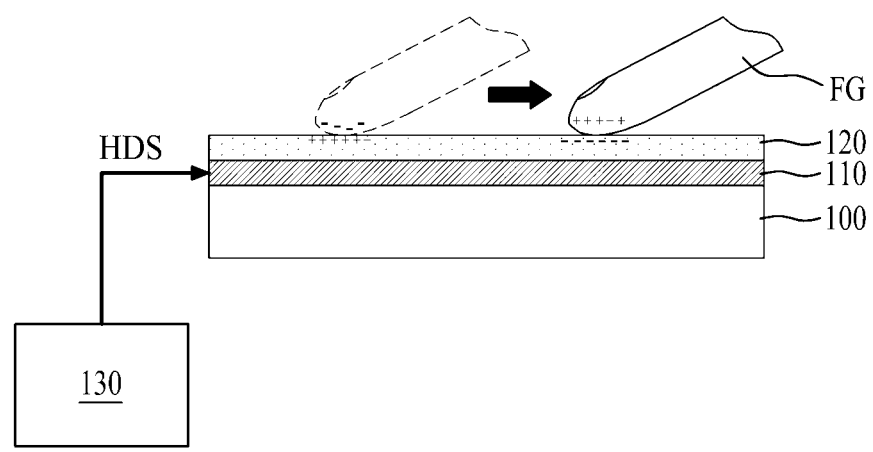
FIG. 3 is a diagram briefly illustrating a haptic driving apparatus according to one embodiment of the present invention.
Figure 4:
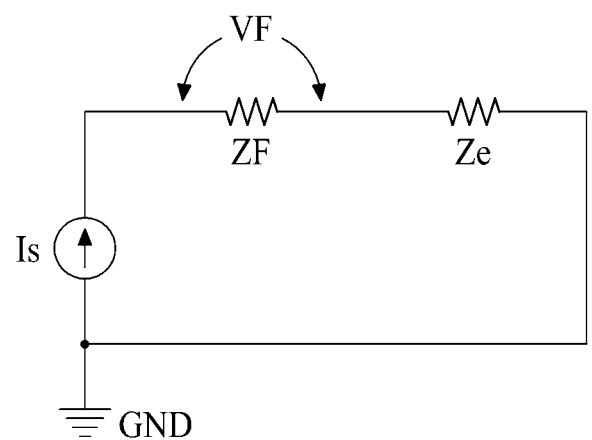
FIG. 4 is an equivalent circuit diagram illustrating a haptic driving apparatus according to one embodiment of the present invention.

FIG. 3 is a diagram briefly illustrating a haptic driving apparatus according to one embodiment of the present invention, and FIG. 4 is an equivalent circuit diagram illustrating a haptic driving apparatus according to one embodiment of the present invention.

Referring to FIGS. 3 and 4, the haptic driving apparatus according to one embodiment of the present invention includes a haptic electrode 110, an insulator 120, and a haptic driver 130.

The haptic electrode 110 is made of a conductive material and provided on a base member 100. The base member 100 may be a glass substrate or plastic substrate. The base member 100 and the haptic electrode 110 may be an integrated electrode sheet.

The insulator 120 is provided to cover the haptic electrode 110. This insulator 120 serves as a dielectric that forms a capacitor between the haptic electrode 110 and a finger FG of a human body. Also, the insulator 120 prevents the human body from being got electrically shocked by the haptic electrode 110 by electrically insulating the human body from the haptic electrode 110.

The base member 100, the haptic electrode 110 and the insulator 120 may constitute a capacitance type touch screen. In this case, the haptic electrode 110 may be a touch electrode and/or a sensing electrode.

The haptic driver 130 generates a haptic driving signal HDS for providing a user with electrovibration based on an electrostatic force between the finger FG and the haptic electrode 10, and supplies the generated haptic driving signal HDS to the haptic electrode 110. At this time, the haptic driver 130 uniformly controls the haptic driving signal HDS supplied to the haptic electrode 110 by monitoring the haptic driving signal HDS supplied to the haptic electrode 110 in real time. That is, the haptic driver 130 detects an output current corresponding to an output voltage supplied to the haptic electrode 110, and uniformly maintains the current flowing in the haptic electrode 110 on the basis of a variance of the detected output current or allows only a set current to be flown in the haptic electrode 110.

The aforementioned haptic driving apparatus according to one embodiment of the present invention may provide a user with electrovibration of certain strength regardless of a variation of a surrounding environment by supplying a certain haptic driving signal HDS signal to the haptic electrode 110 through the haptic driver 130.

According to the electric equivalent modeling of the electrovibration, the haptic driving apparatus according to one embodiment of the present invention may be expressed by finger impedance ZF and external impedance Ze, which are serially connected between a current source Is and a ground GND. In this case, since each of the finger impedance ZF and the external impedance Ze is defined in the same manner as the related art, the finger impedance ZF may have a constant value, and the external impedance Ze may be varied depending on whether a user body is grounded.

A valid voltage VF that generates the electrovibration is affected by a variance of the external impedance Ze, which is varied depending on whether the user body is grounded, instead of the finger impedance ZF having a constant value. However, in the present invention, since the haptic driving signal HDS supplied to the haptic electrode 110 is uniformly controlled through real time monitoring, the valid voltage VF is determined by a multiply calculation value Is×ZF of the haptic driving signal HDS and the finger impedance ZF in accordance with an ohm rule without being affected by the variance of the external impedance Ze, which is caused depending on the user body is grounded and by the variance of the surrounding environment.

Therefore, the haptic driving apparatus according to one embodiment of the present invention may uniformly maintain the valid voltage VF, which generates electrovibration, by uniformly maintaining the haptic driving signal HDS supplied to the haptic electrode 110 regardless of the external impedance Ze varied depending on whether the user body is grounded and by the variance of the surrounding environment, and as a result, may provide the user with electrovibration of certain strength regardless of the variance of the surrounding environment. As a result, the user may always feel elecrovibration of certain strength by touching the insulator 120 (or touch screen) even though the surrounding environment is varied.

Figure 5:
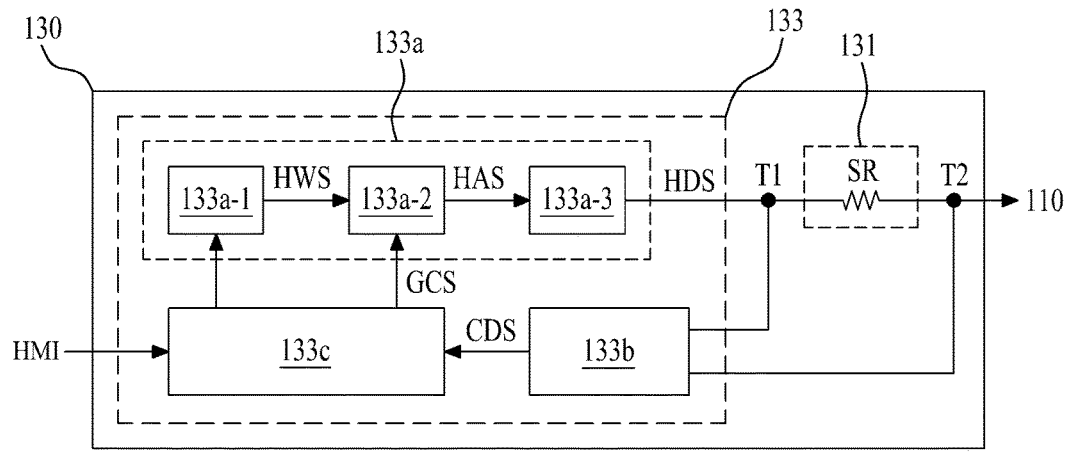
FIG. 5 is a diagram illustrating a haptic driver according to one embodiment of the present invention.

FIG. 5 is a diagram illustrating a haptic driver according to one embodiment of the present invention.

Referring to FIG. 5, the haptic driver 130 according to one embodiment of the present invention includes a current monitor 131 and a haptic electrode driver 133.

The current monitor 131 is electrically connected to the haptic electrode 110 to monitor a current supplied to the haptic electrode 110. More specifically, the current monitor 131 is electrically connected between the haptic electrode driver 133 and the haptic electrode 110. The current monitor 131 generates a monitoring voltage through voltage drop of the haptic driving signal HDS output from the haptic electrode driver 133. The current monitor 131 according to one embodiment may be a shunt resister (SR) serially connected to an output terminal of the haptic electrode driver 133.

The haptic electrode driver 133 generates the haptic driving signal HDS and monitors the monitoring voltage generated by the current monitor 131 in real time while supplying the generated haptic driving signal HDS to the haptic electrode 110 through the current monitor 131, thereby uniformly controlling the current supplied to the haptic electrode 110. That is, the haptic electrode driver 133 generates the haptic driving signal HDS, supplies the generated haptic driving signal HDS to the haptic electrode 110 through the current monitor 131, detects the monitoring voltage generated by the current monitor 131, and varies the haptic driving signal HDS in accordance with the detected current corresponding to the detected voltage, whereby the current supplied to the haptic electrode 110 is uniformly controlled.

The haptic electrode driver 133 according to one embodiment includes a haptic driving signal generator 133a, a current detector 133b, and a haptic controller 133c.

The haptic driving signal generator 133a generates the haptic driving signal HDS under the control of the haptic controller 133c, and output the generated haptic driving signal HDS to the current monitor 131. Therefore, the haptic driving signal HDS is applied to the haptic electrode 110 through the current monitor 131 to generate an electrostatic force between the haptic electrode 110 and a user finger, whereby electrovibration is provided to the user. Particularly, the haptic driving signal generator 133a supplies a certain current to the haptic electrode 110 by varying the haptic driving signal HDS under the control of the haptic controller 133c. The haptic driving signal generator 133a according to one embodiment may include a waveform generator 133a-1, a gain controller 133a-2, and a signal amplifier 133a-3.

The waveform generator 133a-1 generates a haptic basic waveform HWS under the control of the haptic controller 133c, and provides the generated haptic basic waveform HWS to the gain controller 133a-2. In this case, the haptic basic waveform may be a sine wave of several tens of KHz or more for electrovibration, but may be at least predetermined one of a sine wave, an attenuation sine wave, a square wave, a rectangular wave, a sawtooth wave, a triangle wave, a step wave, and a pulse wave, without limitation to the above sine wave.

The gain controller 133a-2 generates a haptic amplification signal HAS by controlling strength of the haptic basic signal HWS provided from the wave generator 133a-1 under the control of the haptic controller 133c, and provides the generated haptic amplification signal HAS to the signal amplifier 133a-3. At this time, the gain controller 133a-2 generates the haptic amplification signal HAS by modulating a voltage and/or amplitude of the haptic basic signal HWS in accordance with the gain control signal GCS supplied from the haptic controller 133c.

The gain controller 133a-2 may control the output of the haptic driving signal HDS in response to a haptic on/off signal supplied from the haptic controller 133c.

The signal amplifier 133a-3 generates the haptic driving signal HDS by amplifying the haptic amplification signal HAS, and outputs the generated haptic driving signal HDS to the current monitor 131. That is, the signal amplifier 133a-3 generates the haptic driving signal HDS having a current value for finally generating electrovibration by amplifying the haptic amplification signal HAS to a high voltage by using a high voltage power source supplied from a high voltage source. The signal amplifier 133a-3 according to one embodiment may be a high voltage amplifier. Meanwhile, if the haptic driving signal HDS has a current value enough for generating electrovibration, the signal amplifier 133a-3 may be omitted. In this case, the haptic amplification signal HAS output from the gain controller 133a-2 is supplied to the haptic electrode 110 through the current monitor 131 as the haptic driving signal HDS.

The current detector 133b detects a current supplied to the haptic electrode 110 through the current monitor 131 in real time, generates a current detection signal CDS corresponding to the detected current and provides the generated current detection signal to the haptic controller 133c. That is, the current detector 133b is connected to both ends of the current monitor 131, generates the current detection signal CDS corresponding to the current flowing in the current monitor 131 and provides the generated current detection signal CDS to the haptic controller 133c.

Figure 6:
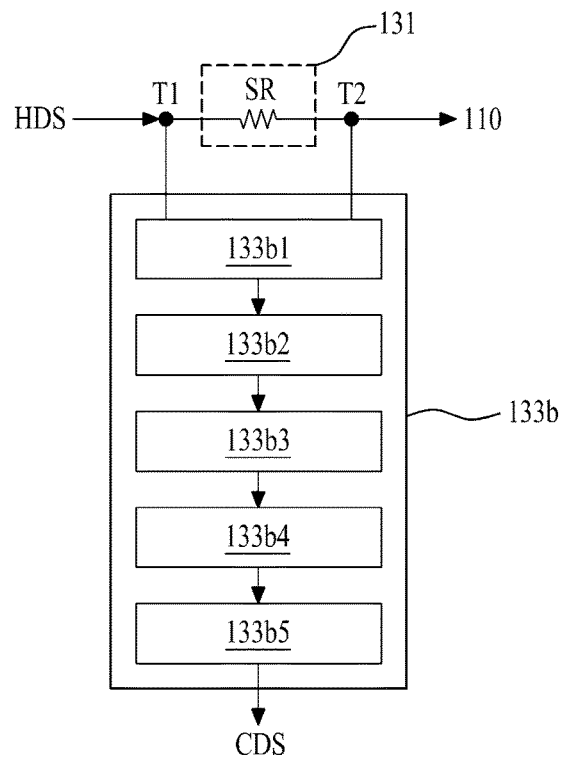
FIG. 6 is a diagram illustrating a current detector shown in FIG. 5.

The current detector 133b according to one embodiment, as shown in FIG. 6, may include a differential amplifier 133b1, a filter 133b2, an amplifier 133b3, a rectifier 133b4, and a regulator 133b5.

The differential amplifier 133b1 is connected to both ends of the current monitor 131 and detects a voltage applied to both ends of the current monitor 131. To this end, the differential amplifier 133b1 may include a non-inverted terminal connected to an output terminal of the haptic driving signal generator 133a, that is, an input terminal T1 of the current monitor, and an inverted terminal connected to an output terminal T2 of the current monitor 131 directly connected to the haptic electrode 110. This differential amplifier 133b1 outputs a detection voltage which is proportional to the voltage difference between the input terminal T1 and the output terminal T2 of the current monitor 131.

The filter 133b2 filters the detection voltage output from the differential amplifier 133b1 and provides the filtered filtering voltage to the amplifier 133b3. This filter 133b2 serves to remove direct current (DC) offset of the detection voltage output from the differential amplifier 133b1.

The amplifier 133b3 amplifies and outputs the detection voltage supplied through the filter 133b2 on the basis of a detection gain value which is set. At this time, the detection gain value supplied to the amplifier 133b3 may be supplied from the haptic controller 133c.

The rectifier 133b4 generates a direct current voltage by rectifying the detection voltage amplified and supplied by the amplifier 133b3.

The regulator 133b5 generates the current detection signal CDS by controlling the direct current voltage supplied from the rectifier 133b4. The regulator 133b5 according to one embodiment may be an alternating current (AC) integrator.

The current detector 133b may generate the current detection signal CDS by amplifying a voltage difference between both ends of the current monitor 131 by using the differential amplifier 133b1, thereby detecting the current flowing in the haptic electrode 110.

Referring to FIG. 5 again, the haptic controller 133c uniformly controls the current supplied to the haptic electrode 110 by varying the output voltage of the haptic driving signal generator 133a in accordance with the current detection signal CDS supplied from the current detector 133b. In more detail, the haptic controller 133c calculates current detection data by analog-to-digital converting the current detection signal CDS supplied from the current detector 133b and then compares the current detection data with predetermined reference current data, and generates a gain control signal GCS for uniformly maintaining the current supplied to the haptic electrode 110 in accordance with the compared result to control the haptic driving signal generator 133a, thereby always uniformly controlling the current flowing in the haptic electrode 110. At this time, the haptic controller 133c may generate the gain control signal GCS by comparing an average value of at least 100 or more of the current detection signal CDS with reference current data to improve a signal to noise ratio.

The haptic controller 133c may receive a detection gain value set from the user and an inner parameter for setting the haptic driving signal generator 133a through a user interface HMI.

Figure 7A:
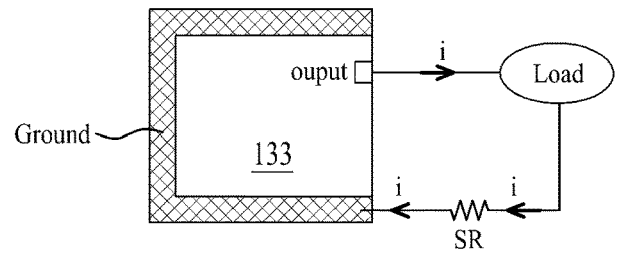
FIGS. 7A to 7D are diagrams illustrating a method for detecting a current flowing in a haptic electrode.

Meanwhile, as a method for detecting a current, it is general that one end of the shunt resistor SR is connected to the ground as shown in FIG. 7A. In this case, since it is not required to consider a voltage output from the haptic electrode driver 133 to a load, a current sensor of the haptic electrode driver 133 may be comprised of a simple amplification circuit.

Figure 7B:
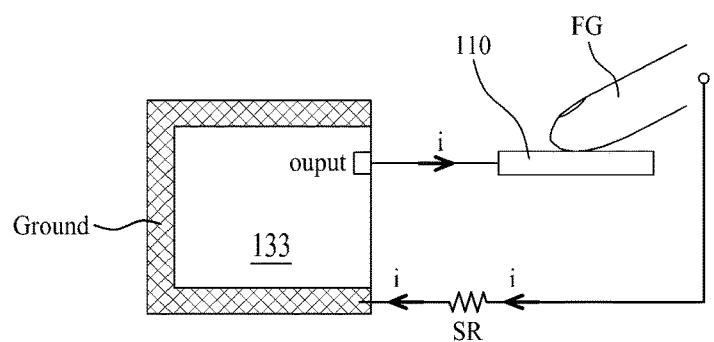

If a user is directly grounded, as shown in FIG. 7B, one end of the shunt resistor SR may be connected to the ground, whereby the current sensor of the haptic electrode driver 133 may be comprised of a simple amplification circuit.

Figure 7C:
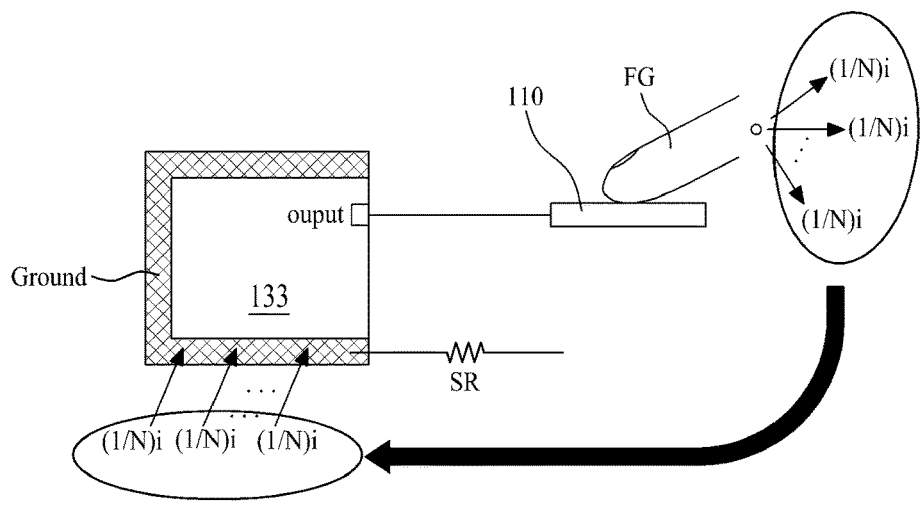

However, since it is likely that the user is not grounded directly in case of electrovibration, as shown in FIG. 7C, when a charge (1/N)i applied to the user returns to a circuit, the charge may return to the ground of the circuit through the air instead of the shunt resistor SR. For this reason, no current flows in the shunt resistor SR, whereby the current cannot be detected.

Figure 7D:
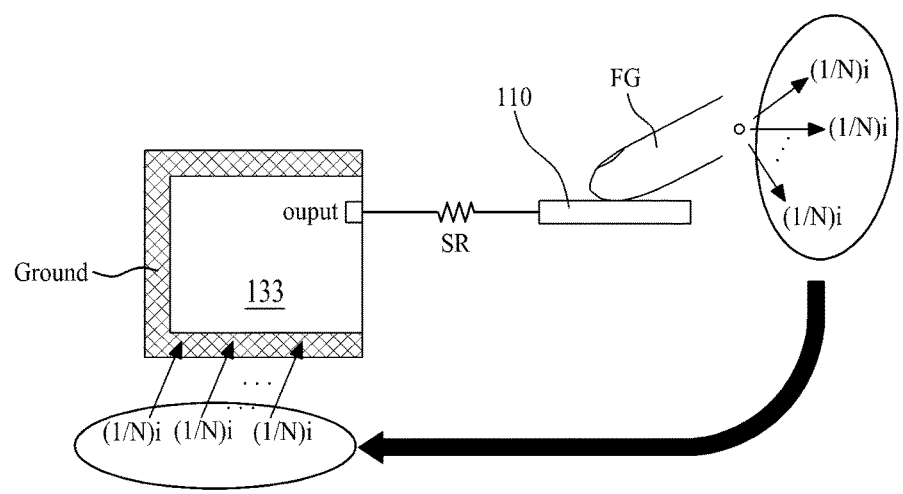

Therefore, as shown in FIGS. 5 and 7D, the shunt resistor SR according to the present invention is connected to an output side of the haptic electrode driver 133, whereby the current output from the haptic electrode driver 133 is supplied to the haptic electrode 110 through the shunt resistor SR. Therefore, according to the present invention, the current flowing in the haptic electrode 110 may be detected through the current detector 133b connected to both ends of the shunt resistor SR regardless of the fact whether the user is grounded.

As described above, the haptic driver 130 according to one embodiment of the present invention uses the shunt resistor SR as the current monitor, and always uniformly controls the current flowing in the haptic current 110 by detecting the voltage difference between both ends of the shunt resistor SR and varying the haptic driving signal HDS. Therefore, in the present invention, electrovibration of certain strength may always be provided to the user even though the surrounding environment is varied.

Figure 8:
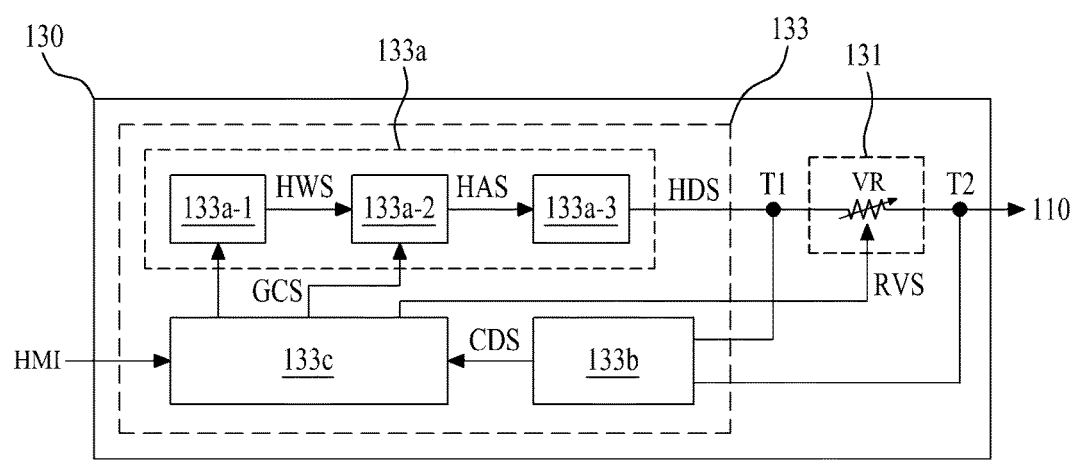
FIG. 8 is a diagram illustrating a haptic driver according to another embodiment of the present invention.

FIG. 8 is a diagram illustrating a haptic driver according to another embodiment of the present invention. The current monitor and the haptic controller of the haptic driver according to one embodiment shown in FIG. 5 are modified in FIG. 8. Therefore, description related to the current monitor and the haptic controller will only be made hereinafter, and repeated description of the other elements except the current monitor and the haptic controller will be omitted.

The current monitor 131 is electrically connected to the haptic electrode 110 to monitor the current supplied to the haptic electrode 110, and may be a digital variable resistor VR serially connected to the output terminal of the haptic electrode driver 133.

The digital variable resistor VR has a resistance value corresponding to a resistance variable signal RVS supplied from the haptic controller 133c to uniformly control the current supplied from the haptic electrode driver 133 to the haptic electrode 110.

The haptic controller 133c uniformly controls the current supplied to the haptic electrode 110 by varying the resistance value of the current monitor 131, that is, the digital variable resistor VR, in accordance with the current detection signal CDS provided from the current detector 133b that detects the voltage applied to both ends of the current monitor 131 comprised of the digital variable resistor VR. In more detail, the haptic controller 133c calculates current detection data by analog-to-digital converting the current detection signal CDS supplied from the current detector 133b and then compares the current detection data with predetermined reference current data, and generates a resistance variable signal RVS for uniformly maintaining the current supplied to the haptic electrode 110 in accordance with the compared result to vary the resistance value of the digital variable resistor VR, thereby always uniformly controlling the current flowing in the haptic electrode 110. At this time, the haptic controller 133c may generate the resistance variable signal RVS by comparing an average value of at least 100 or more of the current detection signal CDS with reference current data to improve a signal to noise ratio.

Additionally, the haptic controller 133c controls the gain controller 133a-2 of the haptic driving signal generator 133a by generating the gain control signal having a reference gain value.

As described above, the haptic driver 130 according to another embodiment of the present invention uses the digital variable resistor VR as the current monitor, and always uniformly controls the current flowing in the haptic current 110 by detecting the voltage difference between both ends of the digital variable resistor VR and varying the resistance value of the digital variable resistor VR. Therefore, in the present invention, detection and control of the current flowing in the haptic electrode 110 may be performed at the same time by the digital variable resistor VR only, whereby size and rated capacity of the gain controller 133a-2 included in the haptic electrode driver 133 may be reduced.

Figure 9:
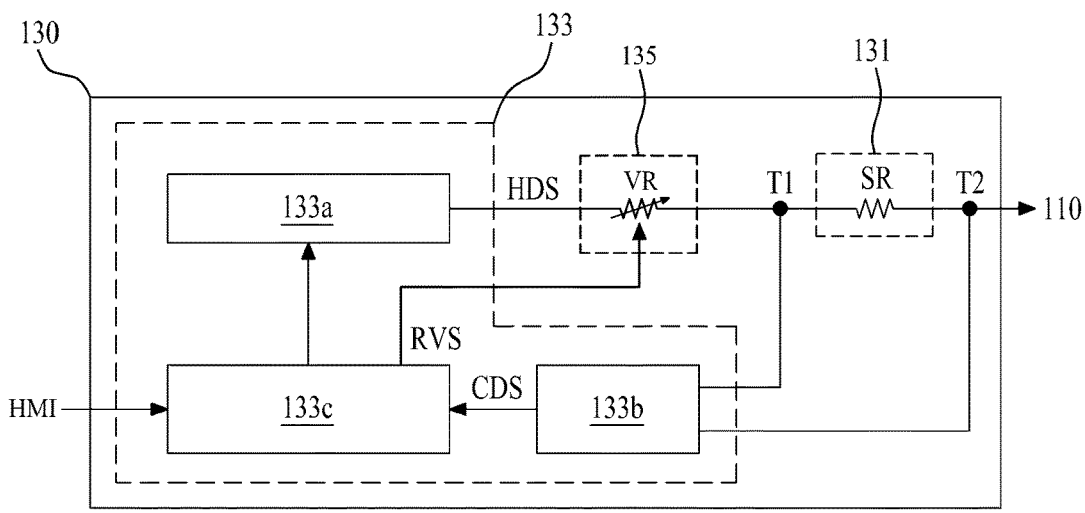
FIG. 9 is a diagram illustrating a haptic driver according to other embodiment of the present invention.

FIG. 9 is a diagram illustrating a haptic driver according to other embodiment of the present invention. In FIG. 9, a voltage variable portion is further included in the haptic driver according to one embodiment shown in FIG. 5, and some elements of the haptic controller are modified. Therefore, description related to the voltage variable portion and the haptic controller will only be made hereinafter, and repeated description of the other elements except the voltage variable portion and the haptic controller will be omitted.

The voltage variable portion 135 is connected between the haptic electrode driver 133 and the current monitor 131 and varies the voltage supplied from the haptic electrode driver 133 to the current monitor 131 under the control of the haptic controller 133c. The voltage variable portion 135 according to one embodiment may be a digital variable resistor VR serially connected between the output terminal of the haptic electrode driver 133 and the current monitor 131.

The digital variable resistor VR has a resistance value corresponding to a resistance variable signal RVS supplied from the haptic controller 133c to uniformly control the current supplied from the haptic electrode driver 133 to the haptic electrode 110.

The haptic controller 133c uniformly controls the current supplied to the haptic electrode 110 by varying the resistance value of the voltage variable portion 135, that is, the digital variable resistor VR, in accordance with the current detection signal CDS provided from the current detector 133b that detects the voltage applied to both ends of the current monitor 131 comprised of the shunt resistor SR. In more detail, the haptic controller 133c calculates current detection data by analog-to-digital converting the current detection signal CDS supplied from the current detector 133b and then compares the current detection data with predetermined reference current data, and generates a resistance variable signal RVS for uniformly maintaining the current supplied to the haptic electrode 110 in accordance with the compared result to vary the resistance value of the digital variable resistor VR, thereby always uniformly controlling the current flowing in the haptic electrode 110. At this time, the haptic controller 133c may generate the resistance variable signal RVS by comparing an average value of at least 100 or more of the current detection signal CDS with reference current data, to improve a signal to noise ratio.

Additionally, the haptic controller 133c controls the gain controller 133a-2 of the haptic driving signal generator 133a by generating the gain control signal having a reference gain value.

As described above, the haptic driver 130 according to other embodiment of the present invention always uniformly controls the current flowing in the haptic current 110 by detecting the voltage difference between both ends of the shunt resistor SR and varying the resistance value of the digital variable resistor VR. Therefore, in the present invention, detection and control of the current flowing in the haptic electrode 110 may be performed through current monitoring based on the shunt resistor SR and voltage control based on the variable resistor VR, whereby the current flowing in the haptic electrode 110 may be controlled more accurately. For this reason, size and rated capacity of the gain controller 133a-2 included in the haptic electrode driver 133 may be reduced. The haptic driving apparatus according to the present invention described as above may be applied to a touch pad, a game pad or a medical device to provide a human body with electrovibration during a contact with the human body, or may be built in electronic devices such as a tablet computer, an electronic dictionary, a smart phone, a smart camera, a smart pad, a game console, a smart television, a computer monitor, a notebook computer, and a netbook computer, to provide the human body with electrovibration during a contact with the human body.

Figure 10:
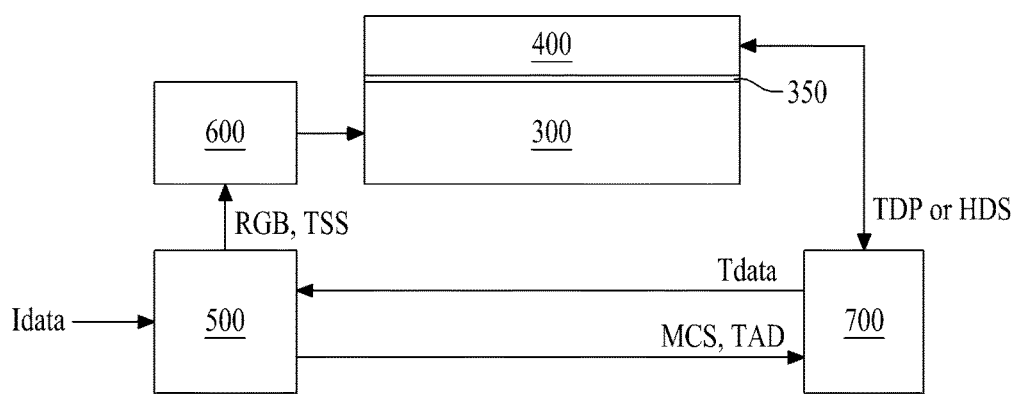
FIG. 10 is a block diagram illustrating an electronic device having a haptic function according to one embodiment of the present invention.
Figure 11:
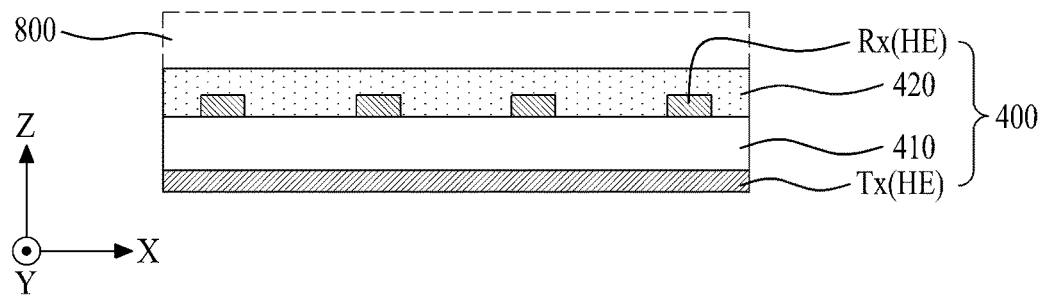
FIG. 11 is a diagram briefly illustrating an electrode structure of a touch panel shown in FIG. 10.

FIG. 10 is a block diagram illustrating an electronic device having a haptic function according to one embodiment of the present invention, and FIG. 11 is a diagram briefly illustrating an electrode structure of a touch panel shown in FIG. 10.

Referring to FIGS. 10 and 11, the electronic device having a haptic function according to one embodiment of the present invention includes a display panel 300, a touch panel 400, a host controller 500, a display driver 600, and a touch panel driver 700. Also, the electronic device having a haptic function according to one embodiment of the present invention may further include peripheral modules known in the art, for example, a communication module, a camera module, an audio play module, a moving image play module, a power source module, an input/output module and a multimedia module, which are not shown, and description of the peripheral modules will be omitted.

The display panel 300 includes a plurality of pixels formed per pixel area defined by data and gate lines. Each of the plurality of pixels displays a predetermined image in response to a signal supplied from the display driver 600. The display panel 300 that includes the plurality of pixels is a liquid crystal display panel or organic light emitting display panel, which is known in the art, and its detailed description will be omitted.

The touch panel 400 is arranged on a display surface of the display panel 300 by a transparent adhesive 350. The touch panel 400 according to one embodiment includes a base substrate 410, a plurality of first electrodes Tx, a plurality of second electrodes Rx, and an insulator 420.

The base substrate 410 may be made of a transparent plastic material, for example, at least one of PET (polyethyleneterephthalate), PC (polycarbonate), PES (polyethersulfone), PEN (polyethylenapthanate), and PNB (polynorborneen).

The plurality of first electrodes Tx are provided in parallel with one surface (for example, lower surface) of the base substrate 410 to have predetermined intervals while being arranged in parallel with a first direction X. Each of the plurality of first electrodes Tx according to one embodiment may have a line shape in parallel with the first direction X but may include a plurality of first electrode patterns having a diagonal shape, for example, a diamond shaped plane, to be connected with one another along the first direction X without limitation to the line shape. The plurality of first electrodes Tx may be used as touch driving electrodes for detecting a touch position of a user, and may be used as haptic electrodes that provide a user's finger with electrovibration. In this case, the plurality of first electrodes Tx may be used as the touch driving electrodes only.

The plurality of first electrodes Tx are arranged on the display panel 300 by the transparent adhesive 350 such as an OCA (optical clear adhesive) or OCR (optical curable resin).

The plurality of second electrodes Rx are provided in parallel with the other surface (for example, upper surface) of the base substrate 410 to have predetermined intervals while being arranged in parallel with a second direction Y crossing each of the plurality of first electrodes Tx. Each of the plurality of second electrodes Rx according to one embodiment may have a line shape in parallel with the second direction Y but may include a plurality of second electrode patterns having a diagonal shape, for example, a diamond shaped plane, to be connected with one another along the second direction Y without limitation to the line shape. Each of the second electrode patterns may be arranged between the first electrode patterns. In this case, the first and second electrode patterns are arranged in a check pattern. The plurality of second electrodes Rx may be used as touch driving electrodes for detecting a touch position of a user, and may be used as haptic electrodes that provide a user's finger with electrovibration.

The insulator 420 is provided on the entire upper surface of the base substrate 410 to cover the plurality of second electrodes Rx.

The insulator 420 according to one embodiment is a hard coating layer that serves as a cover layer while serving as an insulating layer or dielectric layer, and may be made of a transparent plastic material, for example, PC (polycarbonate) or PMMA (Polymethylmethacrylate).

The insulator 420 according to another embodiment may be made of a transparent adhesive such as OCA (optical clear adhesive), which serves as an adhesive while serving as an insulating layer or dielectric layer. In this case, a cover window 800 such as a transparent plastic substrate or glass substrate may be attached onto the transparent adhesive such as OCA (optical clear adhesive).

The plurality of first electrodes Tx and the plurality of second electrodes Rx are provided upper and lower surfaces of the base substrate 410 to cross each other, whereby mutual capacitance is formed between the first electrode Tx and the second electrode Rx, which are adjacent to each other. The mutual capacitance Cm serves as a touch sensor that senses a user touch for the touch panel 400.

The aforementioned touch panel 400 may be arranged on the display panel 300 or may directly be attached to the display panel 300. For example, if the display panel 300 is a liquid crystal display panel (or organic light emitting display panel) that includes an upper polarizing film, the touch panel 400 may be arranged on the upper polarizing film or may be arranged between the upper substrate and the upper polarizing film.

The host controller 500 generates image data RGB of a frame unit and a timing synchronization signal TSS on the basis of externally input image source data Idata and supplies the generated image data and timing synchronization signal to the display driver 600.

The host controller 500 generates a mode control signal MCS based on a touch or non-touch on the basis of touch sensing data Tdata provided from the touch panel driver 700. Also, the host controller 500 calculates touch area data TAD for a user touch area on the basis of the touch sensing data Tdata, and provides the touch panel driver 700 with the calculated touch area data TAD and at the same time executes an application program associated with the calculated touch area data TAD.

The display driver 600 supplies a data signal corresponding to the image data RGB to each pixel by using the image data RGB and the timing synchronization signal TSS supplied from the host controller 500, thereby displaying a predetermined image on the display panel 300. For example, the display driver 600 may include a timing controller (not shown) generating a gate control signal and a data control signal by using the timing synchronization signal TSS supplied from the host controller 500 and generating pixel data by aligning the image data RGB, a gate driving circuit generating a gate signal in accordance with the gate control signal to supply the generated gate signal to a plurality of gate lines in due order, and a data driving circuit (not shown) converting the pixel data to a data signal in accordance with the data control signal to supply the converted signal to a data line.

The touch panel driver 700 is driven in a touch sensing mode and a haptic driving mode in accordance with the mode control signal MCS provided from the host controller 500.

During the touch sensing mode, the touch panel driver 700 supplies a touch driving pulse TDP to the plurality of first electrodes Tx in due order, senses a capacitance variation of the touch sensor, which is caused by the user touch for the touch panel 400, through the plurality of second electrodes Rx to generate touch sensing data Tdata, and provides the generated touch sensing data to the host controller 500.

During the haptic driving mode, the touch panel driver 700 generates the haptic driving signal HDS and supplies the generated haptic driving signal HDS to the electrode of the touch panel 400 through the aforementioned current monitor. At this time, the haptic driving signal HDS may be supplied to the plurality of first electrodes Tx or the plurality of second electrodes Rx, or may be supplied to the plurality of first and second electrodes Tx and Rx. Moreover, the haptic driving signal HDS may be supplied to at least one first electrode Tx or/and at least one second electrode Rx. Therefore, the electrode of the touch panel 400 to which the haptic driving signal HDS is supplied during the haptic driving mode will hereinafter be defined as the haptic electrode HE.

Figure 12:
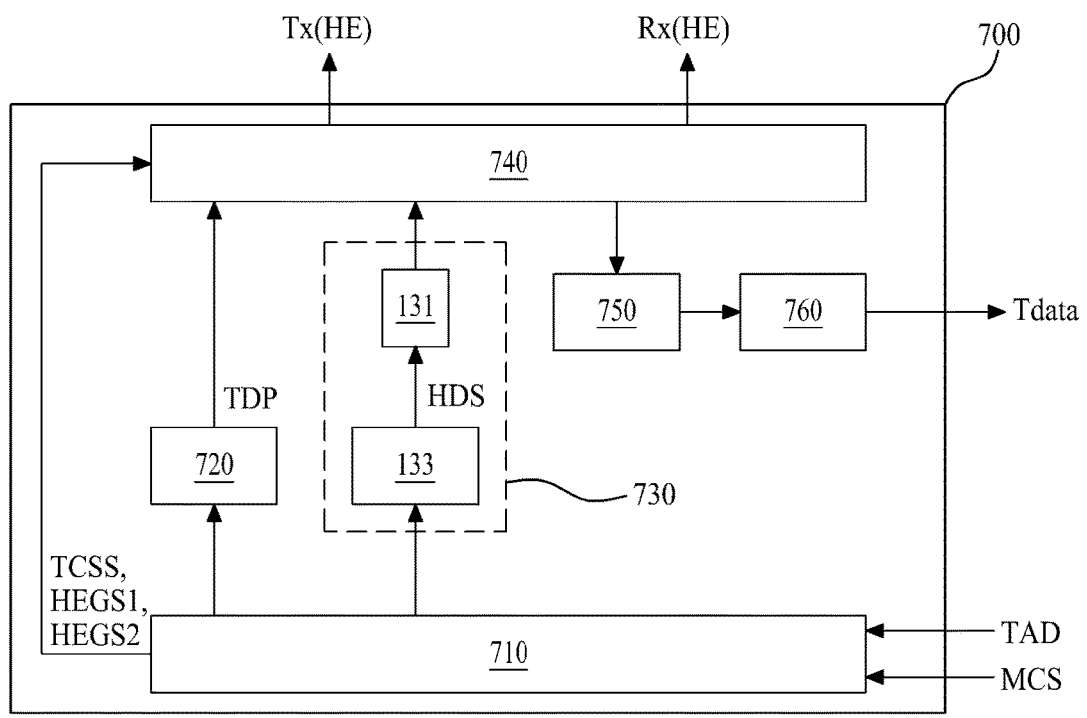
FIG. 12 is a block diagram illustrating a touch panel driver shown in FIG. 10.

The touch panel driver 700 according to one embodiment, as shown in FIG. 12, includes a timing generator 710, a driving pulse supply 720, a haptic driver 730, a channel selector 740, a sensing module 750, and a touch data processor 760. The touch panel driver 700 constructed as above may be integrated as one ROIC (Readout Integrated Circuit) chip. However, the touch data processor 760 may be built in the host controller 500 without being integrated in the ROIC chip.

The timing generator 710 generates a timing control signal for the touch sensing mode or the haptic driving mode in response to the mode control signal MCS supplied from the host controller 500. That is, during the touch sensing mode, the timing generator 710 generates a touch timing signal and a touch channel selection signal TCSS for the touch sensing mode in response to the mode control signal MCS of a first logic state, which is supplied if the user touch is not generated from the host controller 500.

During the haptic driving mode, the timing generator 710 according to one embodiment may generate a haptic timing signal for haptic driving in response to the mode control signal MCS of a second logic state, which is supplied if the user touch is generated from the host controller 500, detect a user touch area on the basis of the touch area data TAD supplied from the host controller 500 and generate a first haptic electrode group signal HEGS1 for simultaneously supplying the haptic driving signal HDS to at least one second electrode Rx of the plurality of second electrodes Rx, which is included in the detected user touch area.

During the haptic driving mode, the timing generator 710 according to another embodiment may generate a second haptic electrode group signal HEGS2 for simultaneously supplying the haptic driving signal HDS to at least one first electrode Tx of the plurality of first electrodes Tx, which is included in the detected user touch area.

The driving pulse supply 720 generates a touch driving pulse TDP in response to the touch timing signal supplied from the timing generator 710, and supplies the generated touch driving pulse TDP to the plurality of first electrodes Tx through the channel selector in due order. In this case, the touch driving pulse TDP may be comprised of a plurality of pulses to enhance sensing sensitivity by increasing the charging amount of the touch sensor.

The haptic driver 730 according to one embodiment generates the haptic driving signal HDS in response to the haptic timing signal supplied from the timing generator 710, and supplies the generated haptic driving signal HDS to the haptic electrode HE through the channel selector 740. The haptic driver 730 includes a current monitor 131 and a haptic electrode driver 133 of the haptic driver 130 according to the present invention described with reference to FIGS. 3 to 9. Since the current monitor 131 and the current monitor 131 of the haptic driver 730 are the same as those of the haptic driver 130 except that the current monitor 131 is connected to an input terminal of the channel selector 740, their repeated description will be omitted. Therefore, as described above, the haptic driver 730 according to one embodiment detects the current supplied to the haptic electrode HE through the current monitor 131 in real time and uniformly controls the current supplied to the haptic electrode HE in accordance with the detected current.

The channel selector 740 is individually connected with the plurality of first electrodes Tx and the plurality of second electrodes Rx.

During the touch sensing mode, the channel selector 740 outputs the touch driving pulse TDP supplied from the driving pulse supply 720 to the plurality of first electrodes Tx in due order in response to the touch channel selection signal TCSS supplied from the timing generator 710, and connects each of the plurality of second electrodes Rx with the sensing module 750.

During the haptic driving mode, the channel selector 740 selects the haptic electrode HE of the plurality of second electrodes Rx or the plurality of first and second electrodes Tx and Rx in response to the haptic electrode group signals HEGS1 and HEGS2 supplied from timing generator 710, and supplies the haptic driving waveform HDS supplied from the haptic driver 730 to the selected haptic electrode HE.

The channel selector 740 may include a first switching module (not shown) for selecting at least one second electrode Rx corresponding to the first haptic electrode group signal HEGS1 among the plurality of second electrodes Rx and grouping the selected second electrodes into the haptic electrode, and a second switching module (not shown) for selecting at least one first electrode Tx corresponding to the second haptic electrode group signal HEGS2 among the plurality of first electrodes Tx and grouping the selected first electrodes into the haptic electrode.

The first switching module may include a plurality of first switching elements arranged between the plurality of second electrodes Rx. Each of the plurality of first switching elements serves to selectively connect two adjacent second electrodes with each other in accordance with the first haptic electrode group signal HEGS1. The second switching module may include a plurality of second switching elements arranged between the plurality of first electrodes Tx. Each of the plurality of second switching elements serves to selectively connect two adjacent first electrodes with each other in accordance with the second haptic electrode group signal HEGS2.

The sensing module 750 is connected with each of the plurality of second electrodes Rx through the channel selector 740. The sensing module 750 generates a sensing signal by sensing a capacitance variance of the corresponding touch sensor through each of the plurality of second electrodes Rx in response to a sampling signal of the timing generator 710, and generates touch sensing data Tdata by analog-to-digital converting the generated sensing signal.

The touch data processor 760 receives the touch sensing data Tdata input from the sensing module 750 and stores the received touch sensing data in an inner memory in due order, and transmits the touch sensing data Tdata stored in the inner memory to the host controller 500 in response to a touch report signal of the timing generator 710.

The host controller 500 receives the touch sensing data Tdata transmitted from the touch data processor 760, and compares the received touch sensing data Tdata with a predetermined threshold value to calculate a touch or non-touch and a touch coordinate by using the sensing data greater than the threshold value. The host controller 500 calculates a touch coordinate (XY coordinate) on the basis of position information of the second electrode Rx where the touch sensing data Tdata is generated and position information of the first electrode Tx which is driven, and executes an application program associated with the touch coordinate. Also, the host controller 500 generates touch area data TAD corresponding to the calculated touch coordinate and provides the generated touch area data TAD to the touch panel driver 700.

The aforementioned electronic device having a haptic function according to one embodiment of the present invention includes the haptic driver 720 having a current monitor, whereby electrovibration of certain strength may always be provided to a user even though the surrounding environment is varied during the haptic driving mode.

Meanwhile, the electronic device having a haptic function according to the present invention may be a mobile device, such as a tablet computer, electronic dictionary, a smart phone, a smart camera, a smart pad, or a game console, and a display device such as a smart television, a computer monitor, a notebook computer, and a netbook computer.

As described above, according to the present invention, the current supplied to the haptic electrode is detected to uniformly control the current flowing in the haptic electrode, whereby electrovibration of certain strength may be provided to a user even though the surrounding environment is varied.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A haptic driving apparatus comprising:
   a haptic electrode made of a conductive material;
   an insulating layer covering the haptic electrode;
   a haptic electrode driver generating a haptic driving signal for generating an electrostatic force between the haptic electrode and a user for providing electrovibration to the user and supplying the generated haptic driving signal to the haptic electrode, wherein the haptic electrode driver includes a gain controller configured to modulate a haptic basic signal in accordance with a gain control signal to generate the haptic driving signal, and wherein the haptic electrode driver includes a haptic controller configured to generate a resistance variable signal;
   a variable resistor connected between the haptic electrode driver and the haptic electrode, wherein one end of the variable resistor is coupled to an output terminal of the haptic electrode driver, and wherein the variable resistor is a digital variable resistor that has a resistance value corresponding to the resistance variable signal supplied from the haptic controller; and
   a current monitor connected between the haptic electrode driver and the haptic electrode to monitor current supplied to the haptic electrode, the current supplied based at least in part on the haptic driving signal,
   wherein the haptic electrode driver varies the haptic driving signal in accordance with the current supplied to the haptic electrode by varying a resistance value of the variable resistor, the current supplied being driven through the variable resistor, and the haptic electrode driver varies the resistance value of the variable resistor to control a current supplied from the haptic electrode driver by comparing a current detection signal to a predetermined reference current to maintain the current supplied to the haptic electrode.

2. The haptic driving apparatus of claim 1, wherein the current monitor includes a shunt resistor connected between another end of the variable resistor and the haptic electrode, the current supplied to the haptic electrode being measured based on a voltage difference in voltages at both ends of the shunt resistor.

3. The haptic driving apparatus of claim 2, wherein the haptic electrode driver includes:
   a haptic driving signal generator generating the haptic driving signal in accordance with the gain control signal and supplying the generated haptic driving signal to the haptic electrode through the shunt resistor, the haptic driving signal generator including the gain controller; and
   a current detector detecting the voltage difference between both ends of the shunt resistor to generate the current detection signal.

4. The haptic driving apparatus of claim 2, wherein the haptic electrode driver further includes:
   a haptic driving signal generator generating the haptic driving signal and supplying the generated haptic driving signal to the haptic electrode through the variable resistor and the current monitor, the haptic driving signal generator including the gain controller; and
   a current detector detecting the voltage difference between both ends of the shunt resistor to generate the current detection signal,
   wherein the haptic controller controls the current supplied to the haptic electrode by generating the resistance variable signal in accordance with the current detection signal, and
   wherein the resistance value of the variable resistor is varied depending on the resistance variable signal.

5. The haptic driving apparatus of claim 1, wherein the current monitor includes the variable resistor.

6. The haptic driving apparatus of claim 5, wherein the haptic electrode driver further includes:
   a haptic driving signal generator generating the haptic driving signal and supplying the generated haptic driving signal to the haptic electrode through the variable resistor, the haptic driving signal generator including the gain controller; and
   a current detector detecting a voltage difference between both ends of the variable resistor to generate the current detection signal,
   wherein the haptic controller controls the current supplied to the haptic electrode by generating the resistance variable signal in accordance with the current detection signal, and
   wherein the resistance value of the variable resistor is varied depending on the resistance variable signal.

7. The haptic driving apparatus of claim 1, wherein the haptic electrode driver varies the resistance value of the variable resistor to control the current supplied from the haptic electrode driver by comparing an average value of at least 100 or more of the current detection signal to the predetermined reference current.

8. An electronic device having a haptic function, the electronic device comprising:
   a display panel displaying an image;
   a touch panel arranged on the display panel, having a plurality of first electrodes and a plurality of second electrodes to sense a user touch; and
   a touch panel driver including a sensing module sensing a user touch through the plurality of second electrodes during a touch driving mode and a haptic driver supplying a haptic driving signal to at least one of the first and second electrodes during a haptic driving mode,
   wherein the haptic driver includes:
   a haptic electrode driver generating the haptic driving signal for generating an electrostatic force between the at least one of the first and second electrodes and a user for providing electrovibration to the user and supplying the generated haptic driving signal to the at least one of the first and second electrodes, wherein the haptic electrode driver includes a gain controller configured to modulate a haptic basic signal in accordance with a gain control signal to generate the haptic driving signal, and wherein the haptic electrode driver includes a haptic controller configured to generate a resistance variable signal;
a current monitor to monitor current supplied to the at least one of the first and second electrodes, the current supplied based at least in part on the haptic driving signal; and
a variable resistor connected between the haptic electrode driver and the at least one of the first and second electrodes, wherein one end of the variable resistor is coupled to an output terminal of the haptic electrode driver, and wherein the variable resistor is a digital variable resistor that has a resistance value corresponding to the resistance variable signal supplied from the haptic controller,
wherein the haptic electrode driver varies the haptic driving signal in accordance with the current supplied to the at least one of the first and second electrodes as determined by the current monitor by varying a resistance value of the variable resistor, the current supplied being driven through the variable resistor, and the haptic electrode driver varies the resistance value of the variable resistor to control a current supplied from the haptic electrode driver by comparing a current detection signal to a predetermined reference current to maintain the current supplied to the at least one of the first and second electrodes.

9. The electronic device of claim 8, wherein the touch panel includes:
a base substrate provided with the plurality of first electrodes on one surface and the plurality of second electrodes on another surface; and
an insulator provided on the another surface of the base substrate to cover the plurality of second electrodes.

10. The electronic device of claim 8, wherein the touch panel driver further comprises a channel selector selecting the at least one of the first and second electrodes as a haptic electrode during the haptic driving mode and supplying the haptic driving signal from the haptic driver to the selected haptic electrode, and
wherein the current monitor includes a shunt resistor connected between the output terminal of the haptic electrode driver and an input terminal of the channel selector.

11. The electronic device of claim 10, wherein the haptic electrode driver further includes:
a haptic driving signal generator generating the haptic driving signal in accordance with the gain control signal and supplying the generated haptic driving signal to the haptic electrode through the shunt resistor and the channel selector, the haptic driving signal generator including the gain controller; and
a current detector detecting a voltage difference between both ends of the shunt resistor to generate the current detection signal.

12. The electronic device of claim 10, wherein the haptic electrode driver further includes:
a haptic driving signal generator generating the haptic driving signal and supplying the generated haptic driving signal to the haptic electrode through the variable resistor, the current monitor and the channel selector, the haptic driving signal generator including the gain controller; and
a current detector detecting a voltage difference between both ends of the shunt resistor to generate the current detection signal, wherein the haptic controller controls the current supplied to the haptic electrode by generating the resistance variable signal in accordance with the current detection signal, and
wherein the resistance value of the variable resistor is varied depending on the resistance variable signal.

13. The electronic device of claim 8, wherein the touch panel driver further includes a channel selector selecting the at least one of the first and second electrodes as a selected haptic electrode during the haptic driving mode and supplying the haptic driving signal from the haptic electrode driver to the selected haptic electrode, wherein the current monitor includes the variable resistor connected between the output terminal of the haptic electrode driver and an input terminal of the channel selector.

14. The electronic device of claim 13, wherein the haptic electrode driver further includes:
a haptic driving signal generator generating the haptic driving signal and supplying the generated haptic driving signal to the haptic electrode through the variable resistor and the channel selector, the haptic driving signal generator including the gain controller; and
a current detector detecting a voltage difference between both ends of the variable resistor to generate the current detection signal,
wherein the haptic controller controls the current supplied to the haptic electrode by generating the resistance variable signal in accordance with the current detection signal, and
wherein the resistance value of the variable resistor is varied depending on the resistance variable signal.

15. A haptic device comprising:
a haptic electrode;
a haptic electrode driver configured to generate a haptic driving signal for generating an electrostatic force between the haptic electrode and a user for providing electrovibration to the user and to supply the generated haptic driving signal to the haptic electrode, wherein the haptic electrode driver includes a gain controller configured to modulate a haptic basic signal in accordance with a gain control signal to generate the haptic driving signal, and wherein the haptic electrode driver includes a haptic controller configured to generate a resistance variable signal; and
a variable resistor connected between the haptic electrode driver and the haptic electrode, wherein one end of the variable resistor is coupled to an output terminal of the haptic electrode driver, and wherein the variable resistor is a digital variable resistor that has a resistance value corresponding to the resistance variable signal supplied from the haptic controller,
wherein the haptic electrode driver is configured to vary the haptic driving signal based on a current supplied to the haptic electrode, the current supplied based at least in part on the haptic driving signal, by varying a resistance value of the variable resistor, the current supplied being driven through the variable resistor, and the haptic electrode driver varies the resistance value of the variable resistor to control a current supplied from the haptic electrode driver by comparing a current detection signal to a predetermined reference current to maintain the current supplied to the haptic electrode.

16. The haptic device of claim 15, further comprising:
a detector circuit connected between the variable resistor and the haptic electrode, the detector circuit configured to sense the current supplied to the haptic electrode.

17. The haptic device of claim 16, further comprising a resistor connected between the variable resistor and the haptic electrode,
   wherein the detector circuit is configured to detect a voltage difference between both ends of the resistor to generate the current detection signal.

18. The haptic device of claim 16, wherein the variable resistor is connected between the output terminal of the haptic electrode driver and the detector circuit,
   wherein the detector circuit is configured to detect a voltage difference between both ends of the variable resistor to generate the current detection signal; and
   wherein the haptic controller is configured to control the current supplied to the haptic electrode by varying the resistance value of the variable resistor based on the current detection signal.

19. The haptic device of claim 16, further comprising a resistor connected in series with the variable resistor between the variable resistor and the haptic electrode,
   wherein the variable resistor is connected between the output terminal of the haptic electrode driver and the resistor,
   wherein the detector circuit is configured to detect a voltage difference between both ends of the resistor to generate the current detection signal, and
   wherein the haptic controller is configured to control the current supplied to the haptic electrode by varying the resistance value of the variable resistor based on the current detection signal.

* * * * *